United States Patent [19]
Pease, III et al.

[11] Patent Number: 5,834,124
[45] Date of Patent: Nov. 10, 1998

[54] IMPACT RESISTANT LAMINATED GLASS WINDOWS

[75] Inventors: David H. Pease, III, Cincinnati, Ohio; Steve E. Howes, Pompano Beach, Fla.

[73] Assignee: Pease Industries, Inc., Fairfield, Ohio

[21] Appl. No.: 777,394

[22] Filed: Dec. 27, 1996

[51] Int. Cl.$^6$ ................................. B32B 9/00
[52] U.S. Cl. ................ 428/430; 428/436; 428/458; 428/469; 528/176; 528/193; 528/194; 156/106
[58] Field of Search .................... 428/430, 38, 436, 428/458, 469, 440, 441; 528/176, 193, 194; 156/63, 106, 109

[56]  References Cited

U.S. PATENT DOCUMENTS

| | | | |
|---|---|---|---|
| 2,038,725 | 4/1936 | Fox | 20/56.5 |
| 2,502,304 | 3/1950 | Baker | 18/48 |
| 2,828,235 | 3/1958 | Holland et al. | 154/118 |
| 3,305,623 | 2/1967 | Bakker et al. | 174/35 |
| 3,460,303 | 8/1969 | Algrain et al. | 52/314 |
| 3,765,810 | 10/1973 | Smarook | 425/110 |
| 3,919,023 | 11/1975 | Bowser et al. | 156/107 |
| 3,930,452 | 1/1976 | Van Laethem et al. | 109/80 |
| 4,149,348 | 4/1979 | Pyzewski | 52/172 |
| 4,215,168 | 7/1980 | Yonemura | 428/215 |
| 4,518,446 | 5/1985 | Drennan | 156/63 |
| 4,600,653 | 7/1986 | Washita et al. | 428/425.6 |
| 4,622,249 | 11/1986 | Bowser | 428/34 |
| 4,632,877 | 12/1986 | Watanabe et al. | 428/409 |
| 4,652,472 | 3/1987 | Davies | 428/34 |
| 4,669,241 | 6/1987 | Kelly | 52/400 |
| 4,680,155 | 7/1987 | Rochefort et al. | 264/73 |
| 4,683,171 | 7/1987 | Kuga et al. | 428/354 |
| 4,783,938 | 11/1988 | Palmer | 52/171 |
| 4,791,010 | 12/1988 | Hanley et al. | 428/34 |
| 4,798,695 | 1/1989 | Redel | 264/164 |
| 4,824,722 | 4/1989 | Jarrett et al. | 428/430 |
| 4,952,459 | 8/1990 | Thatcher et al. | 428/426 |
| 5,306,535 | 4/1994 | Shaffer et al. | 428/38 |
| 5,315,797 | 5/1994 | Glover et al. | 52/171.3 |
| 5,352,532 | 10/1994 | Kline | 428/447 |
| 5,622,580 | 4/1997 | Mannheim | 156/106 |
| 5,645,940 | 7/1997 | Teddington, Jr. et al. | 428/430 |

*Primary Examiner*—Terressa Mosley
*Attorney, Agent, or Firm*—Wood, Herron & Evans, L.L.P.

[57]  ABSTRACT

A laminated and insulated glass window construction, especially for use in entryway glass lites. The window includes first and second glass sheets mounted in facing, spaced apart relationship. An adhesive layer is disposed on an outer surface of the first glass sheet and a third glass sheet is adhered to the first glass sheet by the adhesive layer. A decorative element may be disposed within the space created between the first and second glass sheets. This decorative element may be a separate panel or a resinous layer adhered to an inside surface of one of the first and second glass sheets.

30 Claims, 3 Drawing Sheets

IMPACT RESISTANT LAMINATED GLASS WINDOWS

BACKGROUND OF THE INVENTION

This invention generally relates to laminated impact resistant glass and, more specifically, to decorative, impact resistant glass used, for example, in glass lites in and around residential doors.

Impact resistant laminated glass structures have traditionally been used in applications such as bullet-proof screens in banks and post offices, or windshields of automobiles, aircraft and locomotives. Such panels have also been used in display cases in museums or to provide transparent screens in prisons. Laminated glass constructions have not traditionally been used in residential home construction until recently in response to local building codes in hurricane zones.

To date, Applicant does not believe that an acceptable laminated and insulated glass structure has been used in the residential window industry and, more particularly, in the area of decorative glass lites used in and around residential doors. Often, the laminated glass constructions used in applications mentioned above have been too thick, bulky and expensive to be used in these residential applications.

SUMMARY OF THE INVENTION

The present invention therefore includes, among its chief objectives and advantages, the provision of a residential window construction which provides both impact resistance, insulation and low cost. In the most preferred form, the present invention provides a laminated glass window construction which further provides a decorative effect for residential door applications.

Specifically, in its broadest form the present invention comprises a laminated glass window construction having first and second glass sheets mounted in facing, spaced apart relationship. A third glass sheet is adhered to the first glass sheet by an adhesive layer. The space between the first and second glass sheets provides an insulation zone as in typical insulated glass windows. The laminated sheets are disposed on the outside of the window to provide impact resistance and protection for the entryway of a residence, for example. Preferably, all of the glass sheets are formed from tempered glass. Alternatively, the glass may be heat strengthened or a combination of heat strengthened glass sheet and tempered glass sheet may be used according to the needs of the application. The adhesive used is preferably polyester resin.

In another embodiment of this invention, a decorative element is disposed in the space between the first and second glass sheets. This decorative element may comprise a decorative, translucent element mounted in spaced relation to both the first and second glass sheets and may, for example, comprise a multi-pane element having the look of leaded or stained glass. This element may be formed to simulate multiple panes, such as through molding, or may comprise actual glass or translucent panes connected together with came elements formed from brass or other metal lie rods.

In still another embodiment of this invention, the decorative element may comprise a resinous layer disposed on an inside surface of the second glass sheet. This resinous layer may be molded to have a decorative pattern of grooves on the surface facing the outside of the window.

These and other advantages and objects of the invention will become readily apparent to those of ordinary skill upon review of the following detailed description of the preferred embodiments taken in conjunction with the accompanying drawings.

DETAILED DESCRIPTION OF THE PREFERRED EMBODIMENTS

Figure 1A:
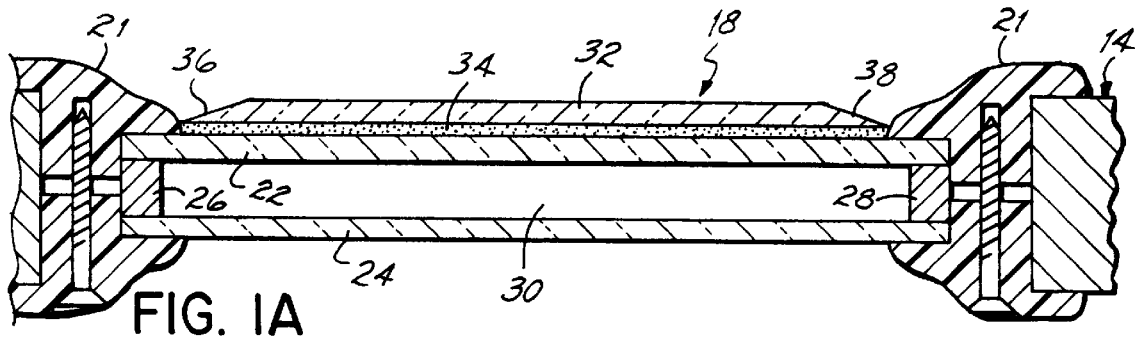
FIG. 1A is a cross-section taken along line 1A—1A of FIG. 1.
Figure 1:
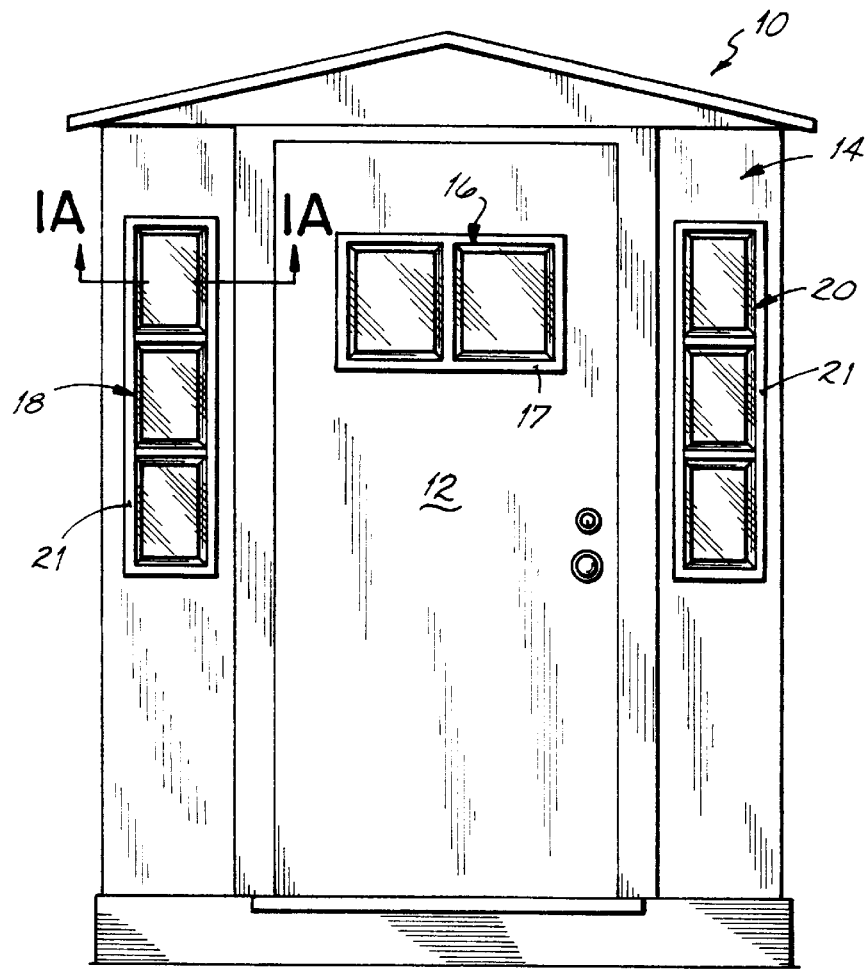
FIG. 1 is a plan view of a residential entryway, including a door and adjacent glass lites, each incorporating windows formed according to a first embodiment of the invention.

FIG. 1 illustrates a door assembly 10 including a door 12 and surrounding frame and entryway structure 14. Door 12 includes a glass lite 16 within a frame 17. Frame and entryway structure 14 includes glass lites 18, 20 with respective frames 21 adjacent to door 12. Each of the glass lites 16, 18, 20 may be formed according to a preferred embodiment of this invention shown more particularly in FIG. 1A.

FIG. 1A illustrates the cross-sectional construction of the laminated and insulated glass structure of this invention with respect to glass lite 18, although it will be understood that glass lites 16 and 20 are formed in the same manner. Glass lite 18 comprises first and second glass sheets 22, 24 mounted in spaced apart relation by spacers 26, 28. This forms an insulated air space 30 between glass sheets 22 and 24. This air space 30 may be filled and/or maintained with dry air as is known in the insulated glass industry. A third glass sheet 32 is mounted on an outside surface of glass sheet 22 by an adhesive 34. Adhesive 34 is preferably a polyester resin but may also be any other suitable transparent adhesive used in the laminated glass industry. Glass sheet 32, being the outside glass sheet, may have decorative bevels 36, 38, as desired. Preferably, all three sheets of glass 22, 24, 32 are formed of tempered glass. Alternatively, one or more of the glass sheets may be formed from heat strengthened glass or annealed glass.

Figure 2A:
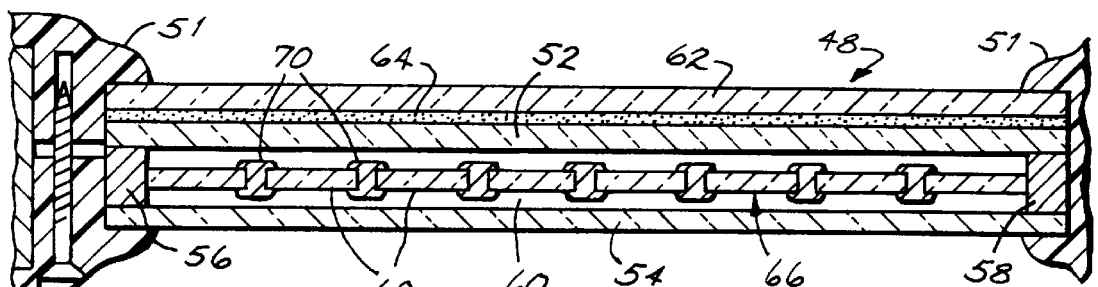
FIG. 2A is a cross-section taken along line 2A—2A of FIG. 2.
Figure 2:
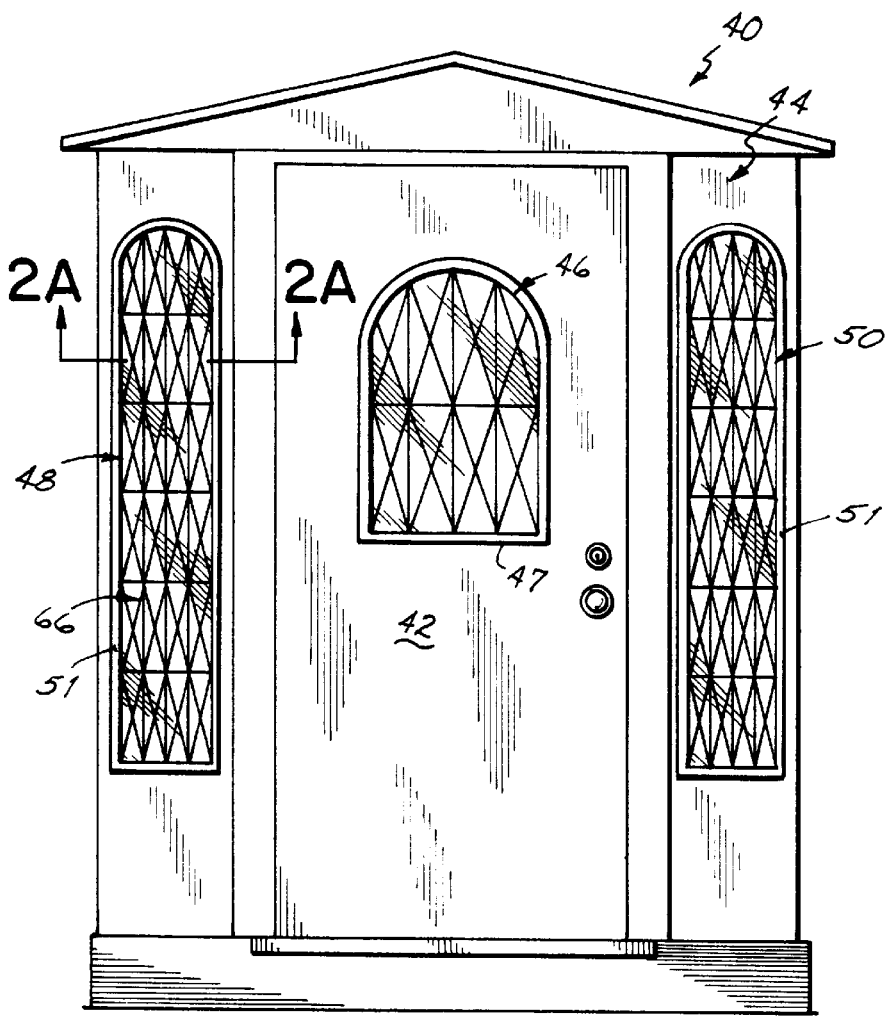
FIG. 2 is a plan view of a residential entryway, including a door and adjacent glass lites, each incorporating windows formed according to a second embodiment of the invention.

FIG. 2 illustrates an entryway 40 incorporating a second embodiment of this invention. Specifically, door assembly or entryway 40 includes a door 42 and surrounding frame and entryway structure 44. Door 42 includes a glass lite 46 held within a frame. Frame and entryway structure 44 includes glass lites 48, 50 with respective frames 51 adjacent to door 42.

The cross-sectional section of glass light 48 is shown more specifically in the cross-section of FIG. 2A. As with the first embodiment, the other glass lites 46 and 50 are constructed in the same manner. Glass lite 48 includes first and second glass sheets 52, 54 mounted in spaced apart relation by spacers 56, 58 to create an air space 60 therebetween. A third glass sheet 62 is adhered to an outer surface of glass sheet 52 by a suitable adhesive 64, such as a polyester resin. A decorative element 66 is mounted within air space 60. Decorative element 66 is preferably mounted to spacers 56, 58 centrally between glass sheets 52, 54. Decorative element 66 comprises a translucent or transparent sheet formed by individual panes of glass, for example, connected to one another by came elements 70. This lends the look of leaded glass to glass lite 48.

Figure 3A:
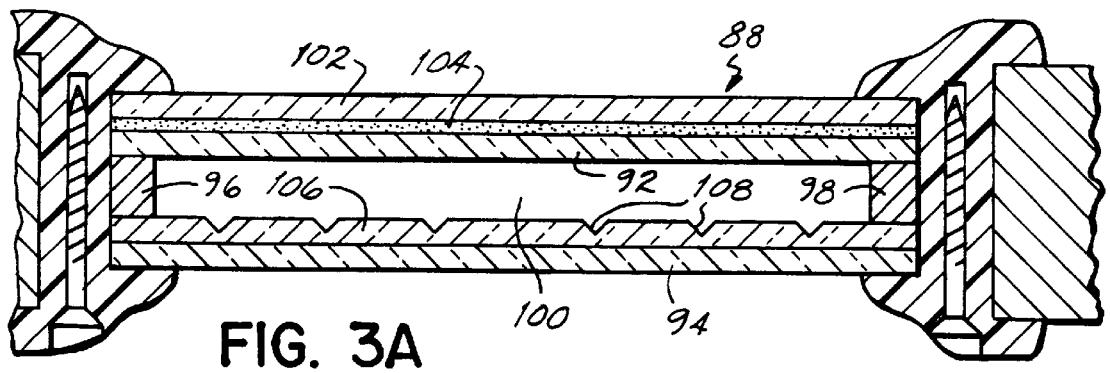
FIG. 3A is a cross-section taken along line 3A—3A of FIG. 3.
Figure 3:
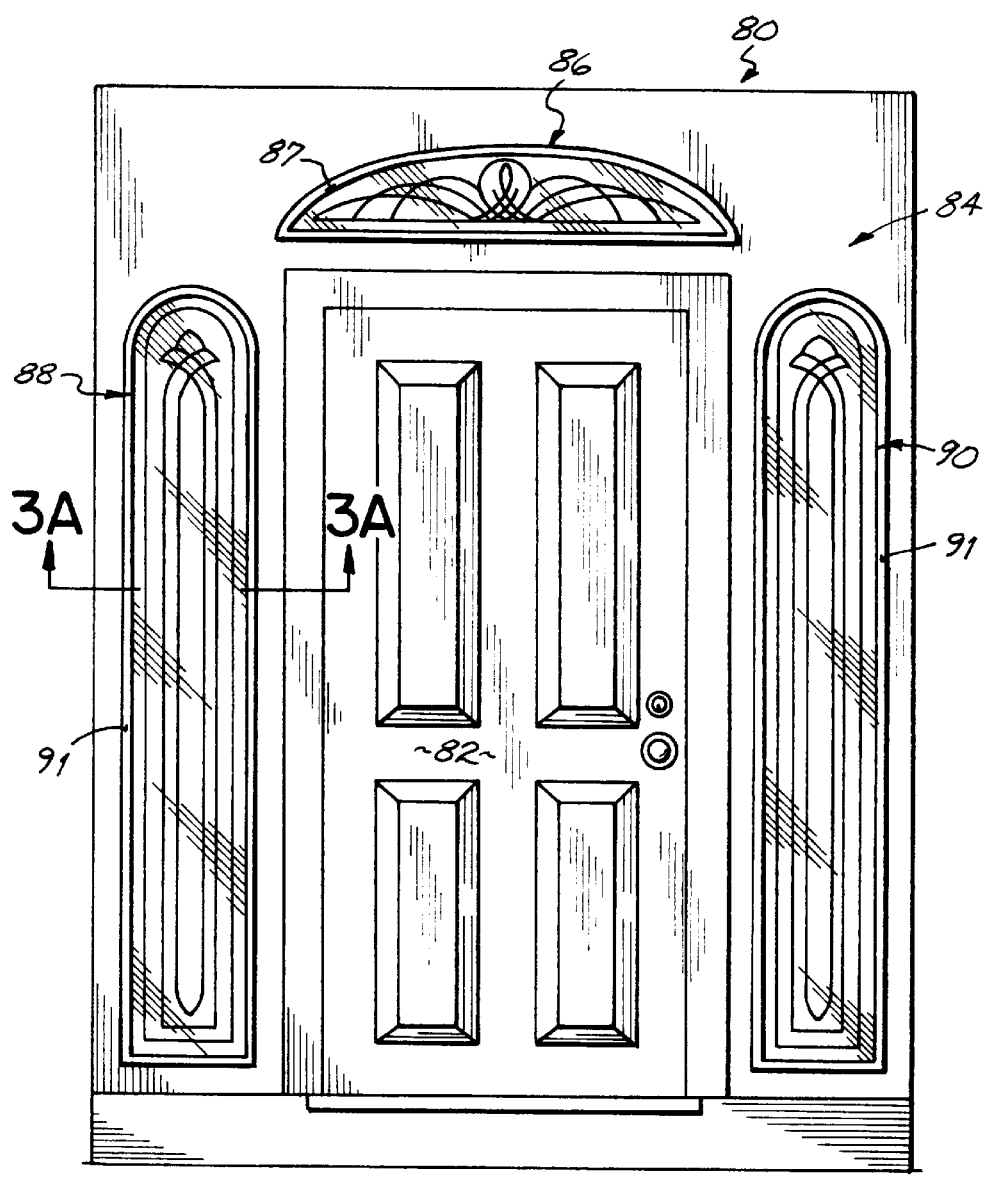
FIG. 3 is a plan view of a residential entryway, including a door and adjacent glass lites, each incorporating windows formed according to a third embodiment of the invention.

FIG. 3 illustrates an entryway or door assembly 80 incorporating a third embodiment of this invention. Door assembly 80 includes a door 82 and surrounding entryway and frame structure 84. A glass lite 86 is mounted above door 82 within a frame 87 and entryway 80 further includes glass lites 88, 90 with respective frames 91 adjacent to door 82. Each of these glass lites, 86, 88, 90 are constructed in accordance with the third embodiment of this invention which is shown more specifically in the cross-sectional view of glass lite 88 represented by FIG. 3A.

More specifically, as shown in FIG. 3A, glass lite 88 includes first and second glass sheets 92, 94 mounted in spaced apart relation by spacers 96, 98 to form an air space 100 therebetween. A third glass sheet 102 is adhered to the outer surface of glass sheet 92 by a transparent adhesive layer 104, which is preferably a polyester resin as in the first two embodiments. In this third embodiment, the second glass sheet 94 includes a decorative element formed on an inside surface thereof facing air space 100 and also facing the outside glass sheets 92 and 102. As shown in both FIG. 3 and 3A, decorative element 106 includes a decorative pattern of grooves 108 to lend an aesthetically pleasing look to the entryway or door assembly 80. Decorative element 106 is preferably formed by molding a plastic material directly on to the inside surface 94A of glass sheet 94 with the desired patterns of groves 108 contained therein. Such a method is described in U.S. patent application Ser. No. 07/807,236, the disclosure of which is hereby fully incorporated by reference herein.

It will be appreciated by the foregoing that the present invention provides secure, insulated glass structure particularly suitable for use in and around residential entryways. In addition to being insulated and impact resistant, the present invention additionally provides easily formed and relatively low cost decorative glass lites.

While specific embodiments of this invention have been discussed in detail, those of ordinary skill will readily recognize many modifications and alternative configurations that still fall within the spirit and scope of this invention. Therefore, Applicant intends to be bound only by the scope of the appended claims.

What is claimed is:

1. A laminated glass window construction comprising:
   first and second glass sheets mounted in facing, spaced apart relationship to create an air space therebetween;
   an adhesive layer disposed on an outer surface of said first glass sheet;
   a third glass sheet adhered to said first glass sheet by said adhesive layer; and
   a decorative element disposed within the air space between the first and second spaced apart glass sheets.

2. The window construction of claim 1 wherein the second glass sheet is tempered glass.

3. The window construction of claim 2 wherein said third glass sheet is tempered glass.

4. The window construction of claim 1 wherein said third glass sheet is tempered glass.

5. The window construction of claim 1 wherein said first glass sheet is tempered glass.

6. The window construction of claim 1 wherein said first glass sheet is heat strengthened glass.

7. The window construction of claim 1 wherein said first, second and third glass sheets are tempered glass.

8. The window construction of claim 1 wherein said first glass sheet is heat strengthened glass and said second and third glass sheets are tempered glass.

9. The window construction of claim 1 wherein said decorative element further comprises a decorative translucent element mounted in spaced relation to both said first and second glass sheets.

10. The window construction of claim 9 wherein said decorative translucent element has a multi-pane appearance.

11. The window construction of claim 10 wherein said decorative translucent element is formed from multiple panes connected together with came elements.

12. A door including a laminated glass lite, said glass lite comprising:
    first and second glass sheets mounted in facing, spaced apart relationship to create an air space therebetween;
    an adhesive layer disposed on an outer surface of said first glass sheet;
    a third glass sheet adhered to said first glass sheet by said adhesive layer; and
    a decorative element disposed within the air space between the first and second spaced apart glass sheets.

13. The door of claim 12 wherein the second glass sheet is tempered glass.

14. The door of claim 13 wherein said third glass sheet is tempered glass.

15. The door of claim 12 wherein said third glass sheet is tempered glass.

16. The door of claim 12 wherein said first glass sheet is tempered glass.

17. The door of claim 12 said first glass sheet is heat strengthened glass.

18. The door of claim 12 wherein said first, second and third glass sheets are tempered glass.

19. The door of claim 12 wherein said first glass sheet is heat strengthened glass and said second and third glass sheets are tempered glass.

20. The door of claim 12 wherein said decorative element further comprises a decorative translucent element mounted in spaced relation to both said first and second glass sheets.

21. The door of claim 20 wherein said decorative translucent element has a multi-pane appearance.

22. The door of claim 21 wherein said decorative translucent element is formed from multiple panes connected together with came elements.

23. The door of claim 12 further comprising door frame structure including one of said glass lites.

24. A door assembly comprising a door and a surrounding door frame, at least one of said door and said door frame including a decorative, laminated glass lite, said glass lite including:
    first and second glass sheets mounted in facing, spaced apart relationship to create an air space therebetween;
    an adhesive layer disposed on an outer surface of said first glass sheet;
    a third glass sheet adhered to said first glass sheet by said adhesive layer; and,
    a decorative element disposed within the air space between the first and second spaced apart glass sheets.

25. The door assembly of claim 24 wherein said decorative element further comprises a decorative translucent element mounted in spaced relation to both said first and second glass sheets.

26. The door assembly of claim 24 wherein said decorative translucent element has a multi-pane appearance.

27. The door assembly of claim 26 wherein said decorative translucent element is formed from multiple panes connected together with came elements.

28. The door assembly of claim 24 herein said decorative element further comprises a resinous layer disposed on an inside surface of the second glass sheet.

29. A laminated glass window construction, wherein the decorative element further comprises:

first and second glass sheets mounted in facing, spaced apart relationship to create an air space therebetween;

an adhesive layer disposed on an outer surface of said first glass sheet;

a third glass sheet adhered to said first glass sheet by said adhesive layer; and a decorative element disposed within the air space between the first and second spaced apart glass sheets, wherein the decorative element comprises a resinous layer dispose on an inside surface of the second glass sheet.

30. A door including a laminated glass lite, wherein the decorative element further comprises:

first and second glass sheets mounted in facing, spaced apart relationship to create an air space therebetween;

an adhesive layer disposed on an outer surface of said first glass sheet;

a third glass sheet adhered to said first glass sheet by said adhesive layer; and a decorative element disposed within the air space between the first and second spaced apart glass sheets, wherein the decorative element comprises a resinous layer disposed on an inside surface of the second glass sheet.

* * * * *

UNITED STATES PATENT AND TRADEMARK OFFICE
CERTIFICATE OF CORRECTION

PATENT NO.  : 5,834,124
DATED       : November 10, 1998
INVENTOR(S) : David H. Pease, III et al.

It is certified that error appears in the above-identified patent and that said Letters Patent is hereby corrected as shown below:

Claim 17, column 4, line 30, after "12" insert --wherein--.

Claim 28, column 5, line 1, change "herein" to --wherein--.

Claim 29, column 5, line 16, change "dispose" to --disposed--.

Signed and Sealed this

Second Day of March, 1999

Attest:

Q. TODD DICKINSON

Attesting Officer

Acting Commissioner of Patents and Trademarks

(12) REEXAMINATION CERTIFICATE (4495th)

United States Patent
Pease, III et al.

(10) Number: US 5,834,124 C1
(45) Certificate Issued: Nov. 27, 2001

(54) IMPACT RESISTANT LAMINATED GLASS WINDOWS

(75) Inventors: David H. Pease, III, Cincinnati, OH (US); Steve E. Howes, Pompano Beach, FL (US)

(73) Assignee: Pease Industries, Inc., Fairfield, OH (US)

Reexamination Request:
No. 90/005,775, Jul. 21, 2000

Reexamination Certificate for:
Patent No.: 5,834,124
Issued: Nov. 10, 1998
Appl. No.: 08/777,394
Filed: Dec. 27, 1996

Certificate of Correction issued Mar. 2, 1999.

(51) Int. Cl.[7] .............................. B32B 9/00; B32B 17/10; B32B 17/00; B32B 17/06
(52) U.S. Cl. ............................ 428/430; 28/34; 28/38; 28/426; 28/436; 28/458; 28/469; 52/204.5; 52/204.59; 52/204.6; 52/204.61; 52/784.1; 52/786.1; 52/786.11; 52/786.13; 52/788.11; 52/796.1
(58) Field of Search .............................. 428/38, 34, 426, 428/969, 228, 430, 436, 458; 52/200, 204.59, 204.5, 204.6, 204.61, 784.1, 786.1, 786.11, 786.13, 788.1, 796.1

(56) References Cited

U.S. PATENT DOCUMENTS

| 2,336,544 | 12/1943 | Hopfield ................................ 154/28 |
| 2,877,516 | 3/1959 | Bobel .................................... 20/56.5 |
| 2,991,213 | 7/1961 | Williams .............................. 154/116 |

(List continued on next page.)

FOREIGN PATENT DOCUMENTS

| 3413539 | 10/1985 | (DE) . |
| 0478836 | 4/1992 | (EP) . |
| 0480892 | 4/1992 | (EP) . |
| 2144792 | 3/1985 | (GB) . |
| 2169239 | 7/1986 | (GB) . |
| 64-28253 | 1/1989 | (JP) . |
| 6-186525 | 7/1994 | (JP) . |

OTHER PUBLICATIONS

Medieval Glass Industries Ltd., Jan. 1991.
Specialty Building Products, International Series, "Specialty Designers and Craftsmen Bring You That "Touch of Class"".
Webster's New Collegiate Dictionary, 1981, p. 1232.
Residential Standards 1980, For Use by Canada Mortgage and Housing Corporation, Issued by the Associate Committee on the National Building Code National Research Council of Canada Ottawap. 17.
National Building Code of Canada 1977, Issued by the Associate Committee of the National Building Code National earch Council of Canada Ottawa, pp. 221, 223.
Canadian Standards Association, CSA Standard 01322–M1977 Wood Doors, (SI Units) pp. 16, 26.
Montgomery County Public Library Gen'l Reference Ctr. Gold (GPIP), Custom Builder, Jan.–Feb. 1996 v. 11, n. 1, pp 44(7), "From Sea to Shinine Sea: Coastal Construction", Christina Nelson.
Montgomery County Public Library Gn'l Reference Ctr. Gold (GPIP), Professional Builder (1993), Jun. 1995 v. 60, No. 9, pp 29(2), "Can Your Window Stantd Up to Abuse Like This?", Dan McLeister.

(List continued on next page.)

Primary Examiner—Vivian Chen

(57) ABSTRACT

A laminated and insulated glass window construction, especially for use in entryway glass lites. The window includes first and second glass sheets mounted in facing, spaced apart relationship. An adhesive layer is disposed on an outer surface of the first glass sheet and a third glass sheet is adhered to the first glass sheet by the adhesive layer. A decorative element may be disposed within the space created between the first and second glass sheets. This decorative element may be a separate panel or a resinous layer adhered to an inside surface of one of the first and second glass sheets.

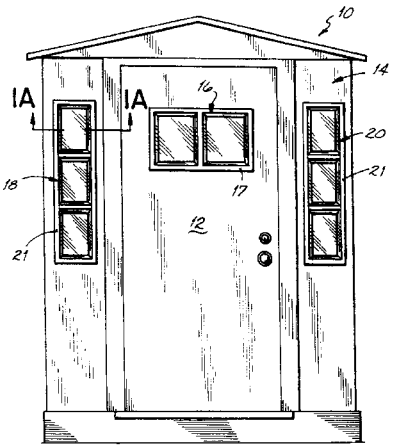

U.S. PATENT DOCUMENTS

| | | | | |
|---|---|---|---|---|
| 3,226,903 | | 1/1966 | Lillethun | 52/616 |
| 3,308,593 | * | 3/1967 | Smith | 52/456 |
| 4,041,208 | * | 8/1977 | Seeger et al. | 428/424 |
| 4,065,284 | * | 12/1977 | Mang et al. | 65/114 |
| 4,081,934 | | 4/1978 | Franz | 52/171 |
| 4,400,194 | | 8/1983 | Starr | 65/114 |
| 4,421,098 | | 12/1983 | Meta | 126/429 |
| 4,598,520 | | 7/1986 | Ellstrom | 52/456 |
| 4,776,141 | * | 10/1988 | Powell | 52/200 |
| 4,792,427 | | 12/1988 | Reeves | 264/285 |
| 5,061,531 | * | 10/1991 | Catalano | 428/34 |
| 5,154,953 | * | 10/1992 | De Moncuit et al. | 428/34 |
| 5,283,995 | | 2/1994 | Richter | 52/202 |
| 5,352,532 | | 10/1994 | Kline | 428/447 |
| 5,434,207 | | 7/1995 | Fischer | 524/270 |
| 5,468,559 | * | 11/1995 | Solinov et al. | 428/410 |
| 5,494,715 | | 2/1996 | Glover | 428/34 |
| 5,558,827 | | 9/1996 | Howes | 264/220 |
| 5,593,784 | * | 1/1997 | Chinzi | 428/413 |
| 5,636,484 | * | 6/1997 | DeBlock | 52/204.5 |
| 5,778,629 | | 7/1998 | Howes | 52/86.11 |
| 5,783,264 | | 7/1998 | Howes | 428/13 |
| 5,834,124 | | 11/1998 | Pease, III et al. | 428/430 |
| 5,937,611 | | 8/1999 | Howes | 52/745.15 |
| 5,944,862 | | 8/1999 | Howes | 65/60.3 |

OTHER PUBLICATIONS

Montgomery County Public Library Gn'l Reference Ctr. Gold (GPIP),, Knight–Ridder/Tribune News Service, Sep. 2, 1996, p. 902K7666, "New Safety Glass on Cutting Edge for Home Security", Connie Prater.

Montgomery County Public Library Gn'l Reference Ctr. Gold (GPIP), Building Design & Construction, Mar. 1992, v. 33, No. 3, pp. 77(1), "Innovative Lamination Techniques Yield Artful Results".

National Research Council Canada, Associate Committee on the National Building Code "National Building Code of Canada 1990", pp. 210–213, 104, 372–373.

National Research Council Canada, Associate Committee on the National Building Code, "Canadian Houseing Code 1990", pp. 37–38, 41.

The Building Code containing the Building Code Act and O. Reg. 419/96, Ministry of Housing Buildings Branch, pp. 244, 246.

National Building Code of Canada 1985, pp. 227–229.

National Building Code of Canada 1980, pp. 222, 224.

* cited by examiner

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–30 are cancelled.

* * * * *